(12) United States Patent
Kapila et al.

(10) Patent No.: US 7,514,049 B2
(45) Date of Patent: Apr. 7, 2009

(54) METHOD AND APPARATUS FOR THERMAL PHASE SEPARATION

(75) Inventors: Mukesh Kapila, The Woodlands, TX (US); Glenn Antle, Houston, TX (US); Zoran Markanovic, Halifax (CA); Paul Gover, Houston, TX (US); Robert Hood, Falmouth (CA); Arthur Martin, Holyrood (CA)

(73) Assignee: M-I L.L.C., Houston, TX (US)

( * ) Notice: Subject to any disclaimer, the term of this patent is extended or adjusted under 35 U.S.C. 154(b) by 555 days.

(21) Appl. No.: 10/412,720

(22) Filed: Apr. 11, 2003

(65) Prior Publication Data
US 2004/0204308 A1 Oct. 14, 2004

(51) Int. Cl.
*A61L 2/04* (2006.01)
*F23B 10/00* (2006.01)

(52) U.S. Cl. ..................... 422/307; 110/295

(58) Field of Classification Search ................ 422/168, 422/307, 309; 110/237, 240, 241, 248; 588/256
See application file for complete search history.

(56) References Cited

U.S. PATENT DOCUMENTS

| | | | |
|---|---|---|---|
| 5,205,225 A * | 4/1993 | Milsap, III | 110/240 |
| 5,290,189 A * | 3/1994 | Hemsath et al. | 432/242 |
| 5,382,002 A | 1/1995 | Evans | |
| 5,927,970 A * | 7/1999 | Pate et al. | 432/115 |
| 6,399,851 B1 * | 6/2002 | Siddle | 203/87 |
| 6,789,353 B2 | 9/2004 | Smullen et al. | |
| 2003/0136747 A1 | 7/2003 | Wood et al. | |
| 2003/0148240 A1 | 8/2003 | Lasagni et al. | |

OTHER PUBLICATIONS

PCT International Search Report dated Aug. 31, 2004 (4 pages).
U.S. Office Action issued in corresponding Application No. 11/408,458; dated May 28, 2008; 11 pages.

* cited by examiner

*Primary Examiner*—Tom Duong
(74) *Attorney, Agent, or Firm*—Osha • Liang LLP

(57) ABSTRACT

An improved thermal phase separation unit separates contaminants from a contaminated substrate. The improved thermal phase separation unit includes an enclosure arranged to withstand temperatures created by a combustion system, an essentially air-tight processing chamber supported within the enclosure by support columns connected between the processing chamber and a bottom of the enclosure, a heat shield disposed between the processing chamber and the bottom of the enclosure, and a vapor handling system arranged to remove vapor from the processing chamber. The combustion system heats the processing chamber, and, in turn, indirectly heats contaminated substrate being processed in the processing chamber so as to volatize contaminants in the contaminated substrate to vapor that is subsequently removed by the vapor handling system.

14 Claims, 5 Drawing Sheets

METHOD AND APPARATUS FOR THERMAL PHASE SEPARATION

BACKGROUND OF INVENTION

1. Field of the Invention

The present invention relates generally to a technique for removing contaminants from a contaminated substrate. More particularly, the present invention relates to a technique for thermally separating contaminants from a contaminated substrate by heating the contaminated substrate so as to volatilize the contaminants into a vapor that is later removed to allow for the recovery of the contaminants.

2. Background Art

Increasing attention has been given to public health consequences resulting from the introduction of industrial wastes, e.g., halogenated and non-halogenated organic compounds, into the environment. Incident with this attention have come governmental regulations that have been put in place to mandate the removal of such industrial wastes to maximum permissible residual levels in the soils and other matrices of former disposal sites.

Traditionally, clean-up of disposal sites involved the procedure of removing contaminated soil or material to a designated secure land fill area. However, the number and volume of designated land fill areas have been greatly reduced, and therefore, there is a growing need to sanitize soils and other matrices with efficient and economical treatment processes.

In one response to this need, portable incineration systems have been proposed. For example, U.S. Pat. No. 4,667,609 issued to Hardison et al. discloses a mobile apparatus for infrared heating of soils contaminated by various hydrocarbons. However, in such incineration systems, the heating step is typically carried out to the point of complete combustion. Hence, operation of such a system is prone to preclusion by governmental regulations that are extremely stringent with respect to the allowable levels of output gases and the like from incineration systems. Furthermore, incineration systems do not allow for the recovery of valuable hydrocarbons in the contaminated substrate.

In another response to the need for efficient and economical sanitization processes, U.S. Pat. No. 4,864,942 issued to Fochtman et al., for example, discloses a method for removing organic compounds, e.g., PCBs, from soils by volatizing the organic compounds at temperatures well below that which are used in the incineration systems described above. Generally, these non-incineration temperatures typically do not exceed 1200 degrees Fahrenheit. However, the time needed for such treatment, i.e., treatment without combustion, to result in complete volatilization of contaminants is often undesirably long. For example, in some cases, such volatilization may take an hour or more, and in some other cases, such as with respect to mercury, volatilization may not occur at all.

In light of the needs to maximize heat transfer to a contaminated substrate using temperatures below combustion temperatures, U.S. Pat. No. 6,399,851 discloses a thermal phase separation unit that heats a contaminated substrate to a temperature effective to volatize contaminants in the contaminated substrate but below combustion temperatures. As shown in FIGS. 3 and 5 of U.S. Pat. No. 6,399,851, the thermal phase separation unit includes a suspended air-tight extraction, or processing, chamber having two troughs arranged in a "kidney-shaped" configuration and equipped with rotating augers that move the substrate through the extraction chamber as the substrate is indirectly heated by a means for heating the extraction chamber.

SUMMARY OF INVENTION

According to one aspect of one or more embodiments of the present invention, an apparatus for separating contaminants from a substrate comprises: an enclosure arranged to withstand temperatures created by a combustion system; an essentially air-tight processing chamber supported within the enclosure by support columns connected between the processing chamber and a bottom of the enclosure, where the combustion system is disposed underneath the processing chamber and arranged to heat the substrate disposed in the processing chamber; at least one heat shield disposed between the processing chamber and the combustion system; and a vapor handling system arranged to remove vapor from the processing chamber.

According to one aspect of one or more embodiments of the present invention, a method for separating contaminants from a contaminated substrate comprises supplying the contaminated substrate to a processing chamber supported by support columns positioned between the processing chamber and a bottom of a firebox housing the processing chamber, moving the contaminated substrate through the processing chamber, heating the contaminated substrate by externally heating the processing chamber so as to volatilize the contaminants in the contaminated substrate, shielding the heating using heat shields positioned between the processing chamber and the bottom of the firebox, and removing vapor resulting from the heating, where the vapor comprises the volatilized contaminants.

According to one aspect of one or more embodiments of the present invention, an apparatus for separating contaminants from a substrate comprises: means for heating; means for enclosing the means for heating, where the means for enclosing comprises means for supporting a means for containing the substrate, and where the means for supporting is connected to a bottom of the means for enclosing; means for moving the substrate through the means for containing; means for shielding the means for heating from the means for containing, where the means for heating indirectly heats the substrate in the means for containing; and means for removing vapor from the means for containing.

Other aspects and advantages of the invention will be apparent from the following description and the appended claims.

DETAILED DESCRIPTION

Many types of contaminated inert substrate materials (also referred to as "contaminated substrate") such as soil, sand, sludge, sediments, drilling muds and cuttings, spent activated carbon, wood, etc., can be successfully treated to remove contaminants such as mercury and various types of organic compounds such as hydrocarbons, PCB's, PCP's, PAH's, insecticides, herbicides, creosote, pesticides, dioxins, furans, and other contaminants commonly found in contaminated substrate materials.

The present invention relates to a method and apparatus for separating contaminants from a contaminated substrate. Furthermore, the present invention is directed to an improvement over the thermal phase separation unit design disclosed in U.S. Pat. No. 6,399,851 issued to Siddle (hereinafter "prior thermal phase separation unit"). This patent is assigned to the assignee of the present invention and is hereby incorporated by reference in its entirety.

In one embodiment, the thermal phase separation technique of the present invention is essentially a two-stage process. The first stage includes using indirect heat transfer to volatilize contaminants in a contaminated substrate. This stage may be referred to as the thermal phase separation process. The second stage involves collecting and cooling the vapors/gases containing the volatilized contaminants and condensing them into liquid form. The condensate is then separated into contaminant and water portions.

Figure 1:
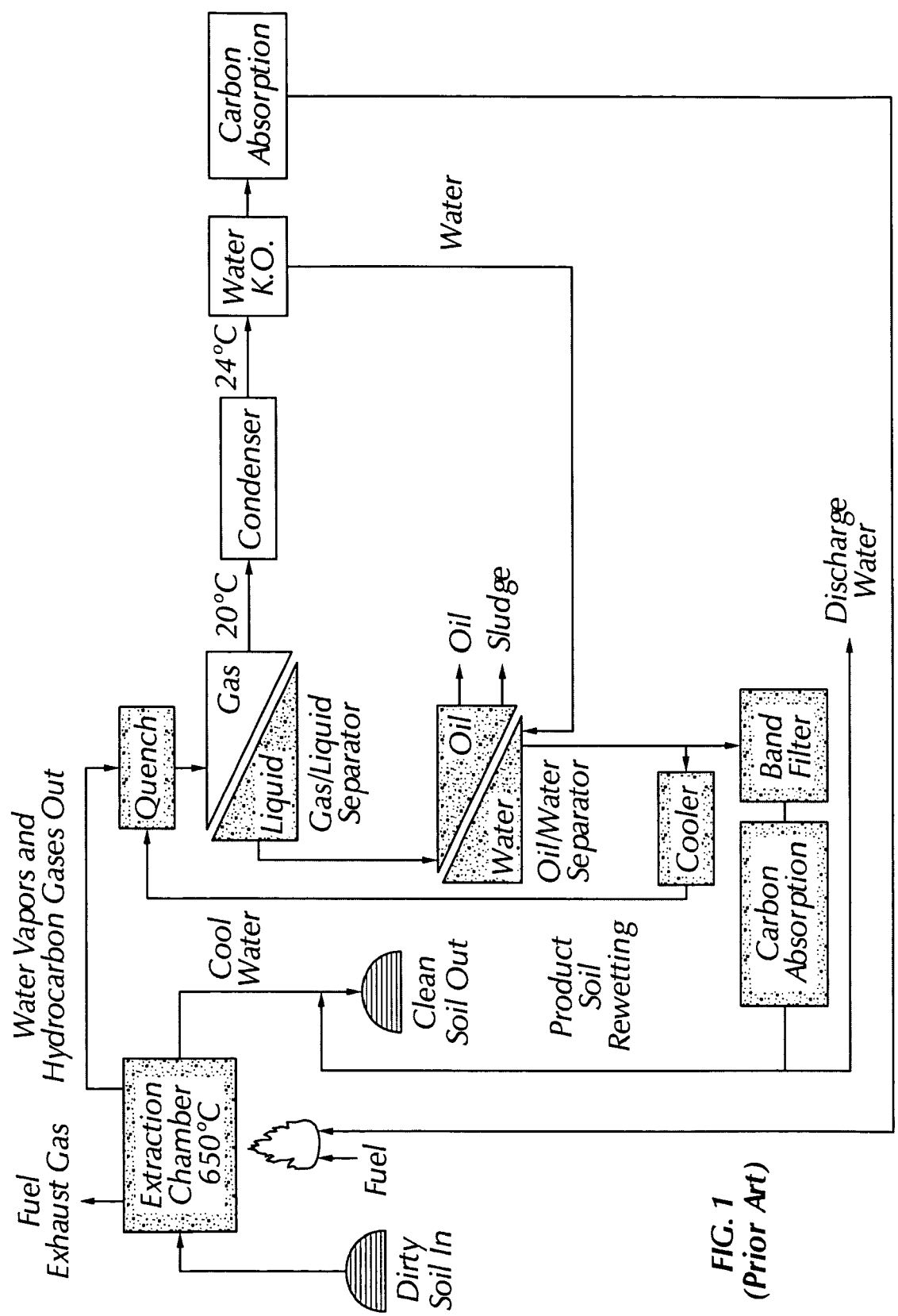
FIG. 1 shows a flow process for separating contaminants from a contaminated substrate.

This two-stage process is shown in FIG. 1 Prior to treatment, contaminated material may be screened to remove stones, rocks, and other debris, and then deposited into a feed hopper. The contaminated material may be fed directly into a feed hopper, or fed from a feed hopper into a lump breaker by a horizontal conveyor belt. From the lump breaker, the contaminated material is discharged onto an inclined conveyor belt for delivery to a feed hopper that directs the contaminated material to rotary paddle airlock valves.

Upon passing through the airlock valves, the contaminated substrate drops into an extraction chamber (also referred to as "processing chamber") and is moved through the extraction chamber by an auger screw. As the contaminated material moves though the extraction chamber, the contaminated material is indirectly heated by a combustion system that supplies heat to the extraction chamber from burners located externally and underneath the extraction chamber. The contaminated substrate remains physically separated from the combustion system by the extraction chamber's steel shell.

An enclosure referred to as "firebox" houses the extraction chamber and burners of the combustion system. As eluded to above, the firebox derives its heat by the combustion of commercially available fuels. The heat can be varied so that the temperature of the contaminated substrate is elevated to the point that the contaminants in the contaminated material are volatilized.

The treated substrate is then passed through a rotary airlock valve at the end of the extraction chamber and become available for rewetting and reintroduction to the environment. The volatilized contaminants are removed from the extraction chamber and directed to a vapor handling system.

The volatilized water and contaminants generated in the extraction chamber are subject to a vapor/gas condensation and clean-up system for the purpose of collection and recovery of the contaminants in liquid form. The vapor/gas condensation and clean-up system preferably includes a plurality of steps. First, the hot volatilized vapors/gases from the extraction chamber are cooled through direct contact water sprays in a quench header and the water required by the quenching process is provided by spray nozzles spaced at regular intervals along the quench header. Second, the vapor/gas stream is then directed through one or more knock-out pots to remove residual particulate matter and large water droplets. Third, the vapor stream is subjected to a water impinger to further remove finer particulate matter and smaller water droplets. Fourth, the relatively dry vapor/gas stream of non-condensable gases is subject to one or more mist eliminators for aerosol removal. Fifth, the vapor/gas stream may be passed through a high efficiency air filtration system to remove any submicron mists or particles still remaining in the vapor/gas stream. Glass media may be used in the filter system to filter material down as a microlite, and, as such, the filters remove liquid mist down to a 0.05 micron level. Finally, the vapor/gas stream may be subjected to a final polishing in a series of carbon absorption beds and subsequently vented to the atmosphere or returned to the burners of the combustion system.

The description given above with regard to the process for separating contaminants from a contaminated substrate is generally applicable to both the prior thermal phase separation unit and the thermal phase separation unit of the present invention.

Figure 2:
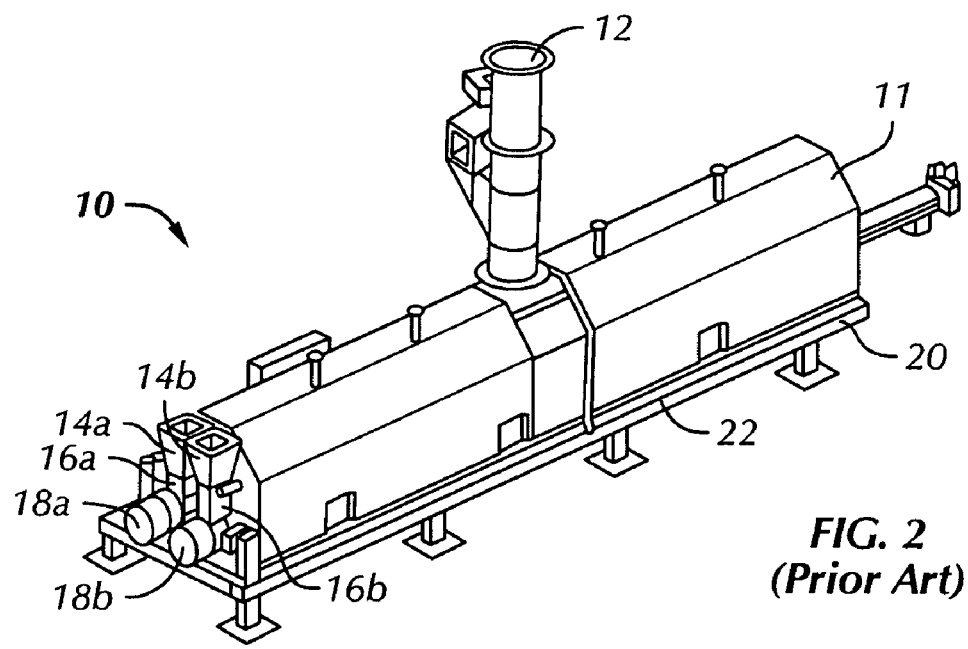
FIG. 2 shows a prior thermal phase separation unit.

A prior thermal phase separation unit 10 is shown in FIG. 2. The prior thermal phase separation unit 10 includes a firebox shell 11 and an emergency exhaust stack 12. At a first end of the prior thermal phase separation unit 10 are in feed chutes 14a, 14b, each of which is respectively connected to input rotary airlock valves 16a, 16b. Below the chutes 14a, 14b are first and second screw drives 18a, 18b. At a second end of the prior thermal phase separation unit 10 is an output rotary airlock valve. The prior thermal phase separation unit 10 is typically mounted on a support bed 20 that has a plurality of support legs 22 mounted on a trailer with wheels.

A thermal phase separation unit of the present invention includes a number of the same components outlined in FIG. 2, but with several modifications and improvements to the prior thermal separation unit design. Accordingly, important differences (discussed below) exist between the prior thermal phase separation unit design and the improved thermal phase separation unit design of the present invention.

I. Container Frame

Figure 3:
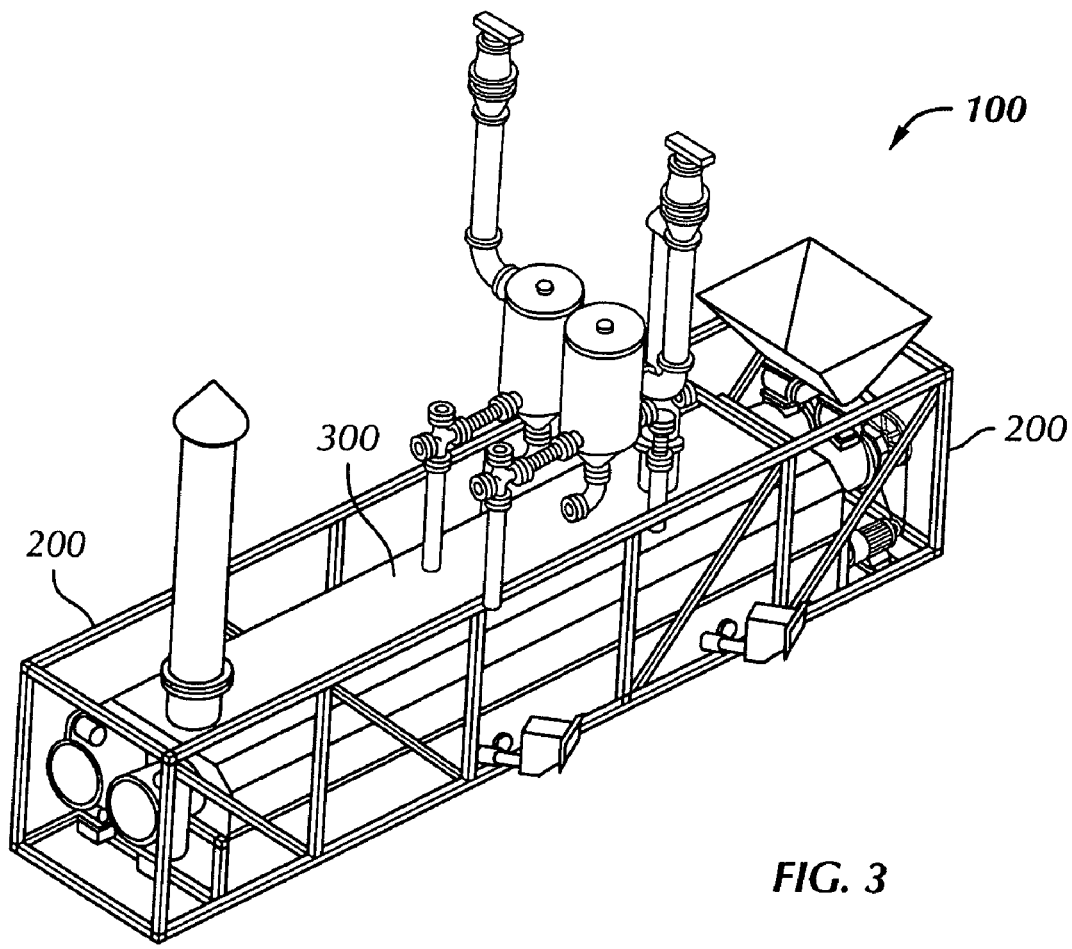
FIG. 3 shows a lateral view of a thermal phase separation unit and container frame in accordance with an embodiment of the present invention.

An exemplary thermal phase separation unit 100 in accordance with an embodiment of the present invention is shown in FIG. 3. As shown in FIG. 3, the thermal phase separation unit 100 is configured to fit into a container frame 200 that is transportable by land, air, or sea. In one embodiment of the present invention, the container frame 200 is approximately 40 feet long so as to be usable with typical freight containers. Moreover, the design of the frame container 200 allows for the loading of components for increased structural integrity.

The transportability of the thermal phase separation unit 100 of the present invention is different from that of prior thermal phase separation unit designs in that the thermal phase separation unit 100 of the present invention is not limited to use only with a flat bed trailer. As disclosed in U.S. Pat. No. 6,399,851, all components of the prior thermal phase separation unit are mounted on a flat bed trailer. This design is limiting in that the transportation of the prior thermal phase separation unit is, among other things, (1) subject to road height restrictions and (2) not suitable for sea transport.

II. Firebox and Heat Shields

Figure 4:
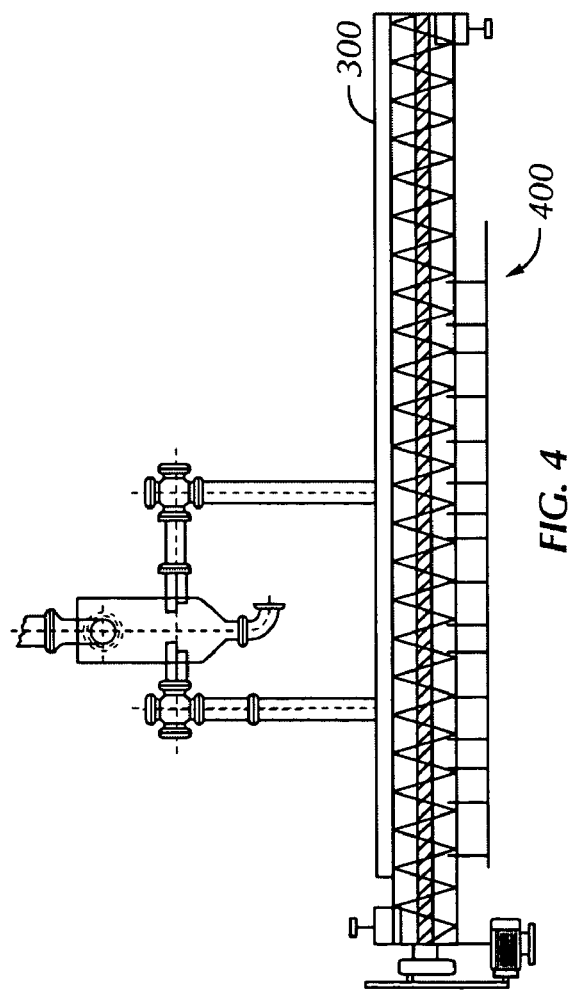
FIG. 4 shows a side view of a thermal phase separation unit in accordance with an embodiment of the present invention.

Referring now to FIGS. 3 and 4, a firebox 300 is configured to allow an extraction chamber disposed within the firebox 300 to be raised so as to create space for one or more heat shields 400. In other words, the firebox 300 includes one or more heat shields 400 that are disposed between an underside of the extraction chamber and burners disposed at a bottom of the firebox 300. The one or more heat shields 400 significantly minimize the impact of burner flames and guard against excessive heat impingement on the extraction chamber.

With respect to prior thermal phase separation units, testing has shown that the burner flames are typically positioned too close to the extraction chamber. Even when a burner flame is not in direct contact with the steel shell of the extraction chamber, excessive temperatures, i.e., "hot spots," have been detected. Moreover, due to the close proximity of a burner flame to one or more temperature controlling thermocouples, a control system for a prior thermal phase separation unit often senses a rapid temperature rise and achievement of a desired temperature, which, in turn, is followed by a shut down of the combustion system resulting in an insufficient heating of the contaminated substrate in the extraction chamber.

In some prior thermal phase separation unit designs, the temperature controlling thermocouples are positioned further away from the burner flames, which, in turn, allows for an extended firing of the combustion system. Although such designs allow for sufficient energy to be provided to the contaminated substrate in the extraction chamber, the close proximity of the burner flames to the extraction chamber cause excessive "hot spots" on the steel shell of the extraction chamber. These "hot spots" lead to premature degradation and thermal stressing of the extraction chamber. In actual operation, degradation of the extraction chamber has manifested in the form of bulges appearing in the vicinity of "hot spots." Furthermore, the overall operating temperatures of prior thermal phase separation units are at temperatures well beyond the boiling points of the target contaminants. In addition to resulting in wasted energy and increased fuel consumption, these higher than necessary operating temperatures adversely impact "hot spots," which, in turn, results in premature metal failure. Accordingly, the use of the one or more heat shields 400 in the thermal phase separation unit of the present invention substantially prevents energy waste and the formation of "hot spots" on the extraction chamber. In one exemplary embodiment of the present invention, the heat shields 400 are fabricated from mild steel checker plate and suspended with rods. Moreover, in one or more embodiments, the heat shield components may be insulated with high temperature ceramic wool insulation.

Figure 5:
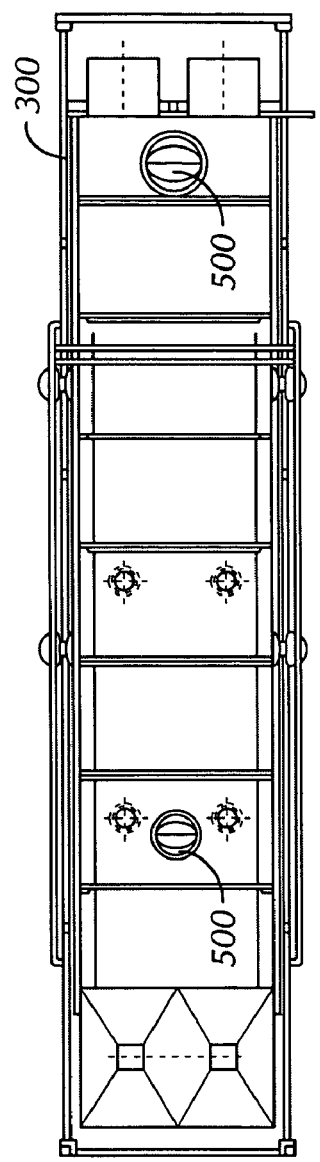
FIG. 5 shows a top view of a thermal phase separation unit in accordance with an embodiment of the present invention.

To further improve the "thermal profile" in the extraction chamber, more than one heating source may be disposed under the extraction chamber along the length of the extraction chamber. As shown in FIG. 5, the firebox 300 includes fuel burners 500, e.g., flue gas stacks, that are disposed at opposing ends of the firebox 300. Such an arrangement improves the top and bottom differential temperatures of the extraction chamber. Moreover, the positioning of the flue gas stacks 500 at opposing ends of the firebox 300 allows for improved distribution of the burner gases; thereby leading to improved firebox temperatures and shortened time for burner gas removal while transferring radiation heat to the extraction chamber.

III. Extraction Chamber

Figure 6:
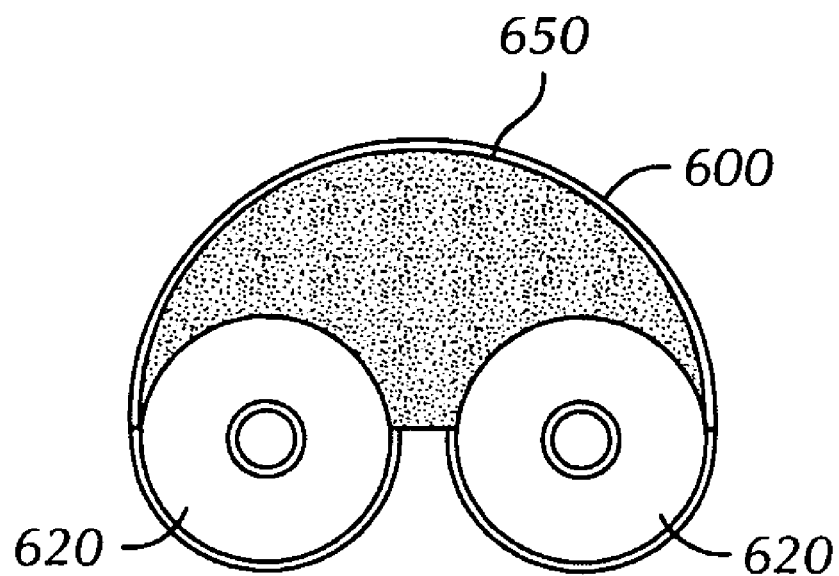
FIG. 6 shows a cross-section of an extraction chamber of a prior thermal phase separation unit.
Figure 7:
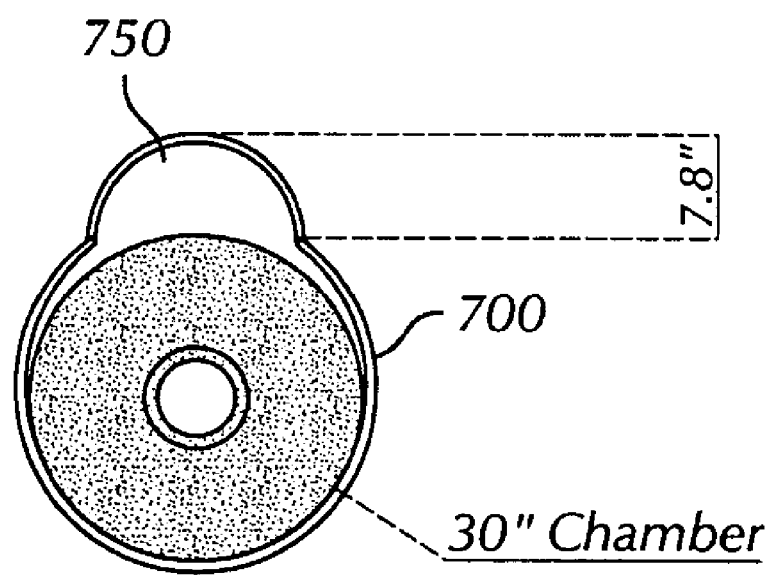
FIG. 7 shows a cross-section of an extraction chamber in accordance with an embodiment of the present invention.

FIG. 6 shows a cross-section of an extraction chamber 600 of a prior thermal phase separation unit. In FIG. 6, the extraction chamber 600 is generally "kidney" shaped, and, as such, has two parallel troughs 620. Contrastingly, in FIG. 7, which shows a cross-section of an exemplary extraction chamber 700 in accordance with an embodiment of the present invention, the extraction chamber 700 is generally tubular in shape.

In FIG. 6, the relatively large head space 650 found in prior thermal phase separation units can, in certain instances, be inefficient. Contrastingly, with respect to FIG. 7, the tubular design of the extraction chamber 700 of the thermal phase separation unit of the present invention allows for a smaller head space 750 relative to the size of the head space 650 in the extraction chamber 600 of prior thermal phase separation units.

The extraction chamber of prior thermal phase separation units is constructed of nickel alloy. Nickel alloy provides some resistance to thermal and erosion degradation and is necessary to combat the high temperatures associated with prior thermal phase separation units discussed above. Contrastingly, the extraction chamber of a thermal phase separation unit in an exemplary embodiment of the present invention is constructed of mild steel. Mild steel provides significantly better thermal conductivity properties and a lower expansion coefficient resulting in improved heat transfer and less expansion movement.

IV. Extraction Chamber Support

Figure 8:
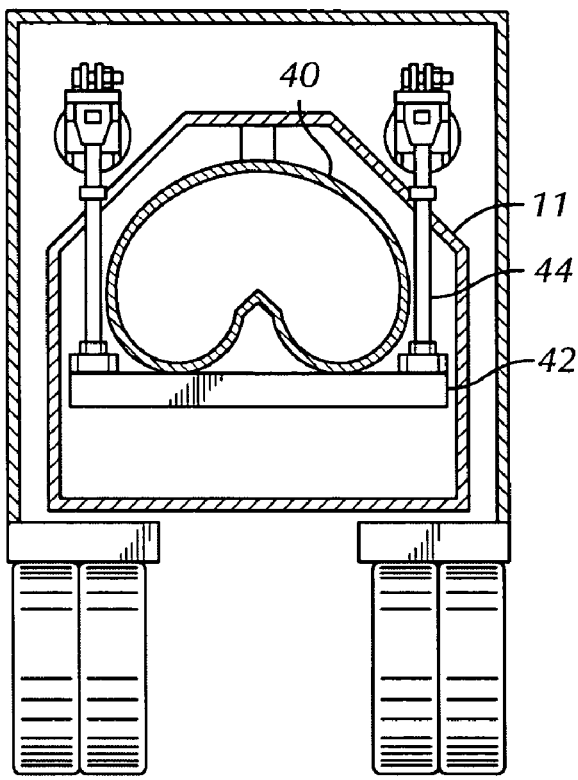
FIG. 8 shows a suspension system of a prior thermal phase separation unit.

As shown in FIG. 8, an extraction chamber 40 of a prior thermal phase separation unit is suspended within the firebox shell 11. The extraction chamber 40 is suspended in place using a cross-beam support 42 suspended from load members 44. The load members 44 suspend the extraction chamber 40 and provide a constant upward force on the extraction chamber 40 to counter downward forces causes by the weight of contaminated substrate disposed within the extraction chamber 40. Such a floating suspension system is necessary due to the excessive movement both vertically and horizontally of the prior thermal phase separation unit extraction chamber 40.

Figure 9:
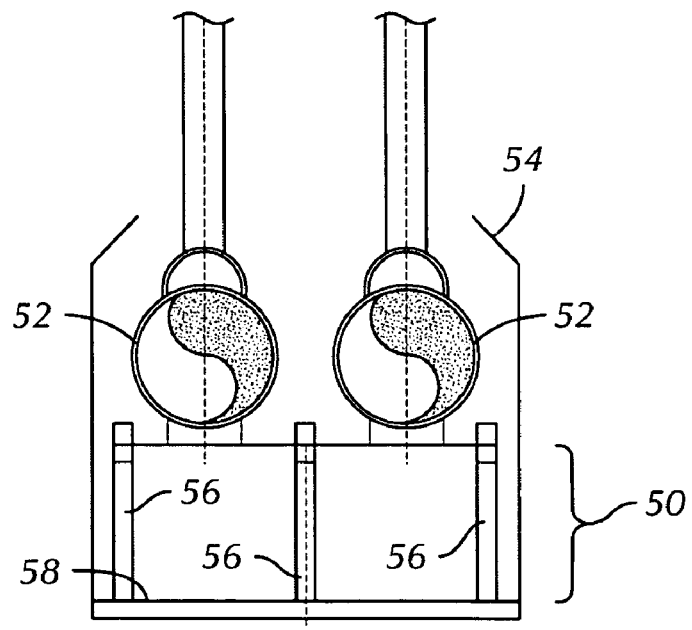
FIG. 9 shows a support system for a thermal phase separation unit in accordance with an embodiment of the present invention.

FIG. 9 shows an exemplary support system for an extraction chamber 52 in accordance with an embodiment of the present invention. As discussed above, a thermal phase separation unit of the present invention has an increased distance 50 between the extraction chamber 52 and the burners disposed along the bottom of the firebox 54. Due to the implementation of heat shields discussed above and use of mild steel for the shell of the extraction chamber 52, movement of the extraction chamber 52 is reduced, and the increased distance 50 may be used for the implementation of a fixed support system 56 disposed between the extraction chamber 52 and a bottom 58 of the firebox shell 54.

Those skilled in the art will understand that other modifications to the thermal phase separation unit of the present invention may be made to effectuate the improvements made to the prior thermal phase separation unit. Accordingly, the differences between the thermal phase separation unit of the present invention and the prior thermal phase separation unit are not limited to those explicitly discussed.

Advantages of the present invention may include one or more of the following. In one or more embodiments of the present invention, a thermal phase separation unit in accordance with one or more present invention has a reduced head space in the extraction chamber. The reduced head space minimizes the possibility of inefficiencies that can result from larger head space designs.

Advantageously, in one or more embodiments of the present invention, the inclusion of heat shields between the extraction chamber and the heating sources of the combustion system improves the thermal profile of the extraction chamber and results in less degradation to the extraction chamber. As a result, the extraction chamber may be used for longer durations of time.

Advantageously, in one or more embodiments of the present invention, the use of a container frame to house a thermal phase separation unit increases the transportability of the thermal phase separation unit.

Advantageously, in one or more embodiments of the present invention, the raising of an extraction chamber within a firebox of a thermal phase separation unit allows for the use of a fixed support system. Such a fixed support system is more simple and easier to implement than a suspended support system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for separating contaminants from a substrate, comprising:
   an enclosure arranged to withstand temperatures created by a combustion system;
   an essentially air-tight processing chamber supported within the enclosure by support columns connected between the processing chamber and a bottom of the enclosure, wherein the combustion system is disposed underneath the processing chamber and arranged to heat the substrate disposed in the processing chamber;
   at least one heat shield disposed between the processing chamber and the combustion system; and
   a vapor handling system arranged to remove vapor from the processing chamber.

2. The apparatus of claim 1, further comprising a container frame arranged to house the enclosure, wherein the container frame is transportable.

3. The apparatus of claim 2, wherein the container frame is approximately 40 feet.

4. The apparatus of claim 1, wherein the combustion system comprises a first burner disposed proximately at one end of the enclosure and a second burner disposed proximately at another end of the enclosure.

5. The apparatus of claim 4, wherein the first burner comprises a first flue gas stack, and wherein the second burner comprises a second flue gas stack.

6. The apparatus of claim 1, wherein the processing chamber has a substrate inlet and a substrate outlet.

7. The apparatus of claim 6, further comprising means for moving substrate from the substrate inlet to the substrate outlet.

8. The apparatus of claim 7, wherein the means for moving substrate is a screw auger.

9. The apparatus of claim 1, wherein the processing chamber comprises at least one tubular shaped trough.

10. The apparatus of claim 1, wherein the processing chamber is constructed of mild steel.

11. The apparatus of claim 1, wherein the vapor handling system comprises a substantially vertically disposed channel attached to the processing chamber.

12. An apparatus for separating contaminants from a substrate, comprising:
   means for heating;
   means for enclosing the means for heating, wherein the means for enclosing comprises means for supporting a means for containing the substrate, and wherein the means for supporting is connected to a bottom of the means for enclosing;
   means for moving the substrate through the means for containing;
   means for shielding the means for heating from the means for containing, wherein the means for heating indirectly heats the substrate in the means for containing; and
   means for removing vapor from the means for containing.

13. The apparatus of claim 12, further comprising means for collecting, condensing, and recovering contaminants in the vapor.

14. The apparatus of claim 12, further comprising means for removing the substrate from the means for containing.

* * * * *